United States Patent
Brulé et al.

(10) Patent No.: US 12,460,078 B2
(45) Date of Patent: Nov. 4, 2025

(54) PULVERULENT COMPOSITION BASED ON PAEK(S), SINTERING CONSTRUCTION PROCESS AND OBJECT DERIVED THEREFROM

(71) Applicants: ARKEMA FRANCE, Colombes (FR); EOS GMBH ELECTRO OPTICAL SYSTEMS, Krailling (DE)

(72) Inventors: Benoît Brulé, Serquigny (FR); Nadine Decraemer, Serquigny (FR); Daniel Fröhlich, Gräfelfing (DE); Verena Galitz, Krailling (DE); Sabine Tutzschky, Seefeld (DE); Andreas Pfister, Fürth (DE)

(73) Assignees: ARKEMA FRANCE, Colombes (FR); EOS GMBH ELECTRO OPTICAL SYSTEMS, Krailling (DE)

( * ) Notice: Subject to any disclaimer, the term of this patent is extended or adjusted under 35 U.S.C. 154(b) by 64 days.

(21) Appl. No.: 18/039,930

(22) PCT Filed: Dec. 2, 2021

(86) PCT No.: PCT/EP2021/083965
§ 371 (c)(1),
(2) Date: Jun. 1, 2023

(87) PCT Pub. No.: WO2022/117727
PCT Pub. Date: Jun. 9, 2022

(65) Prior Publication Data
US 2024/0010835 A1  Jan. 11, 2024

(30) Foreign Application Priority Data
Dec. 4, 2020  (EP) .................................. 20306506

(51) Int. Cl.
| | |
|---|---|
| B33Y 10/00 | (2015.01) |
| B29C 64/153 | (2017.01) |
| B33Y 50/02 | (2015.01) |
| B33Y 70/00 | (2020.01) |
| C08L 71/02 | (2006.01) |
| B29K 71/00 | (2006.01) |

(52) U.S. Cl.
CPC ............ C08L 71/02 (2013.01); B29C 64/153 (2017.08); B33Y 10/00 (2014.12); B33Y 50/02 (2014.12); B33Y 70/00 (2014.12); B29K 2071/00 (2013.01)

(58) Field of Classification Search
USPC ........................................................ 528/127
See application file for complete search history.

(56) References Cited

U.S. PATENT DOCUMENTS

2020/0362120 A1  11/2020  Frangov et al.

FOREIGN PATENT DOCUMENTS

| | | |
|---|---|---|
| EP | 0192260 A1 | 8/1986 |
| EP | 0501436 A2 | 9/1992 |
| EP | 0501436 A3 | 9/1992 |
| EP | 3012297 A1 | 4/2016 |
| EP | 3404009 A1 | 11/2018 |
| EP | 3431522 A1 | 1/2019 |
| EP | 3438085 A1 | 2/2019 |
| KR | 20200091202 A | 7/2020 |
| WO | 2011004164 A2 | 1/2011 |
| WO | 2011004164 A3 | 1/2011 |
| WO | 2012047613 A1 | 4/2012 |
| WO | 2013085947 A1 | 6/2013 |
| WO | 2017116885 A1 | 7/2017 |
| WO | 2017149233 A1 | 9/2017 |
| WO | 2018115033 A1 | 6/2018 |
| WO | 2019243433 A1 | 12/2019 |
| WO | 2020122366 A1 | 6/2020 |

OTHER PUBLICATIONS

Morphology and dynamical mechanical properties of poly ether ketone ketone (PEKK) with meta phenyl links (Year: 2016).*
Quiroga Cortés, Luis, et al. "Morphology and dynamical mechanical properties of poly ether ketone ketone (PEKK) with meta phenyl links." Journal of Applied Polymer Science 133.19 (2016). (Year: 2016).*
European Patent Office, Search Report Issued in Application No. EP20306506.5, May 26, 2021, Germany, 12 pages.
Tencé-Girault, S. et al, "Quantitative Structural Study of Cold-Crystallized PEKK," ACS Applied Polymer Materials, vol. 3, No. 4, Mar. 9, 2021, 14 pages.
Quiroga Cortés, L. et al., "Morphology and dynamical mechanical properties of poly ether ketone ketone (PEKK) with meta phenyl links," Journal of Applied Polymer Science, vol. 133, No. 19, Feb. 2, 2016, 10 pages.

(Continued)

*Primary Examiner* — Terressa Boykin
(74) *Attorney, Agent, or Firm* — Alleman Hall & Tuttle LLP (57) ABSTRACT

The invention relates to a pulverulent composition comprising a powder based on at least one polyaryl ether ketone, said composition having at least a first endothermic peak and a second endothermic peak, the first endothermic peak having a peak temperature strictly greater than 280° C., and the second endothermic peak having a peak temperature equal to a value of 200° C. to 280° C.; the endothermic peaks are measured on a thermogram obtained by differential scanning calorimetry, according to the standard ISO 11357-3: 2018, on first heating, using a temperature ramp of 20° C./minute. The invention also relates to a method for the electromagnetic radiation-mediated layer-by-layer sintering construction of a three-dimensional object from the pulverulent composition, to a method for determining the minimum construction temperature to be used, and also to objects that may be manufactured via this construction process.

17 Claims, 2 Drawing Sheets

(56) References Cited

OTHER PUBLICATIONS

Rueda, D. et al., "Polymorphism in an oligo(aryl ether ketone)," Macromolecular Chemistry and Physics, vol. 198, No. 7, Jul. 1, 1997, 11 pages.
ISA European Patent Office, International Search Report and Written Opinion Issued in Application No. PCT/EP2021/083965, Jan. 26, 2022, WIPO, 17 pages.

* cited by examiner

PULVERULENT COMPOSITION BASED ON PAEK(S), SINTERING CONSTRUCTION PROCESS AND OBJECT DERIVED THEREFROM

TECHNICAL FIELD

The invention relates to the field of polyaryl ether ketone(s).

More particularly, the invention relates to a pulverulent composition based on polyaryl ether ketone(s) (PAEK(s)).

The composition is particularly suitable for use in a process for the electromagnetic radiation-mediated layer-by-layer sintering construction of objects.

PRIOR ART

Polyaryl ether ketones are well-known high-performance technical polymers. They may be used for applications which are restrictive in terms of temperature and/or in terms of mechanical constraints, or even chemical constraints. They may also be used for applications requiring excellent fire resistance and little emission of fumes or of toxic gases. Finally, they have good biocompatibility. These polymers are found in fields as varied as the aeronautical and aerospace sector, offshore drilling, motor vehicles, the railway sector, the marine sector, the wind power sector, sport, construction, electronics or medical implants. They may be used in all the technologies in which thermoplastics are used, such as moulding, compression, extrusion, spinning, powder coating or sinter prototyping.

In general, during laser sintering construction, the PAEK powder of a layer under construction is heated in a construction environment to a temperature Tc, known as the "construction temperature" or "bath temperature", of the order of 10 to 20° C. (typically 15° C.) below its melting point.

A large part of the powder introduced into the sintering machine, generally about 85% to 90%, is not sintered on conclusion of the sintering construction process: this powder is subjected to the construction temperature and remains at this temperature or at a temperature close to it for several hours, or even for several tens of hours. This results in ageing of the powder, notably marked by a change in the structure of the constituent polymer of the powder, in particular with an increase in its molecular mass, and a change in its colour, notably yellowing thereof. The higher the temperature Tc, the faster and the more pronounced the ageing of the powder. It may then become difficult or even impossible to recycle the powder since either it becomes impossible to sinter the powder, or the mechanical properties of the three-dimensional piece, obtained by laser sintering of such a recycled powder, are thereby diminished and insufficient due to the presence of porosities in the sintered pieces.

It is known from patent application EP 3423510 to use a PEKK powder comprising 60% of terephthalic units and 40% of isophthalic units, which has undergone, before being used in a sintering process, a preliminary heat treatment of 120 minutes at 285° C. This powder is used in a laser sintering process having a construction temperature of 285° C. and may be recycled, at least partly, for use in a laser sintering process also having a construction temperature of 285° C. There is currently a need to provide compositions, which can be used in sintering processes at a lower construction temperature than that of the above process, referred to herein below as the "conventional" process, in order notably to be able to limit the ageing of the unsintered powder and to increase the recyclability thereof.

OBJECTIVES

The objective of the invention is to provide a pulverulent composition that is especially suitable for use in a process for the electromagnetic radiation-mediated layer-by-layer sintering construction of objects at a construction temperature that is lower than that of the "conventional" sintering process.

Another objective of the invention is to provide, in at least some embodiments, a composition which can be recycled more easily and a larger number of times, in a subsequent sintering construction process.

Another objective of the invention is to provide, in at least some embodiments, such a composition which is less expensive to produce than the pulverulent compositions used in the "conventional" construction process.

Another objective of the invention is to provide a process for the electromagnetic radiation-mediated layer-by-layer sintering construction of objects using the composition according to the invention.

Another objective of the invention is to provide a method for determining the minimum construction temperature at which the composition can be sintered in the construction process.

Another objective of the invention is to provide, in at least some embodiments, an object manufactured via this process which has properties of the same order as those obtained via the processes of the prior art. In particular, the aim is to obtain an object manufactured via this process which has good mechanical properties and is thus sparingly porous. Furthermore, the aim is to be able to obtain via this process objects which comply with precise dimensions, and which notably do not present any deformation.

Another objective of the invention is to provide, in at least some embodiments, an object manufactured via this process which has acceptable mechanical properties and/or a smooth surface appearance.

SUMMARY OF THE INVENTION

The invention relates to a pulverulent composition comprising a powder based on at least one polyaryl ether ketone. The composition has at least a first endothermic peak and a second endothermic peak, the first endothermic peak having a peak temperature strictly greater than 280° C. and the second endothermic peak having a peak temperature equal to a value of 200° C. to 280° C. Preferentially, the first endothermic peak may have a peak temperature that is greater than or equal to 290° C. Preferentially also, the second endothermic peak may have a peak temperature that is greater than or equal to 220° C. and/or less than or equal to 275° C.

In certain embodiments, the enthalpy measured between 225° C. and 280° C. may represents from 15% to 50% of the total enthalpy measured between 225° C. and 330° C. Preferentially, the enthalpy measured between 225° C. and 280° C. may be greater than or equal to 20% and/or less than or equal to 40%, of the total enthalpy measured between 225° C. and 330° C. on said thermogram.

In certain embodiments, the enthalpy measured between 225° C. and 280° C. may be from 5 J/g to 20 J/g. Preferably, the enthalpy measured between 225° C. and 280° C. may be greater than or equal to 7 J/g and/or less than or equal to 14 J/g.

More preferably, the enthalpy measured between 225° C. and 280° C. may be greater than or equal to 8 J/g and/or less than or equal to 12 J/g.

The endothermic peaks and enthalpies may be measured on a thermogram obtained by differential scanning calorimetry, according to the standard ISO 11357-3: 2018, on first heating, using a temperature ramp of 20° C./minute.

In certain embodiments, the at least one polyaryl ether ketone may be a polyether ketone ketone (PEKK). Said PEKK may consist essentially, and preferentially may consist, of:

a terephthalic repeat unit and an isophthalic repeat unit, the formula of the terephthalic repeat unit being:

(I)

the formula of the isophthalic repeat unit being:

(II)

the molar percentage of terephthalic units relative to the sum of the isophthalic and terephthalic units being from 45% to 75%. Preferably, the molar percentage of terephthalic units relative to the sum of the isophthalic and terephthalic units may be greater than or equal to 48% and/or less than or equal to 72%. More preferably, it may be greater than or equal to 54% and/or less than or equal to 66%. Very preferably, it may be greater than or equal to 58% and/or less than or equal to 64%.

In certain embodiments, said at least one polyaryl ether ketone may be a polymer consisting essentially of, or consisting of:

a repeat unit of formula:

(III)

and a repeat unit of formula:

(IV)

the molar percentage of units (III) relative to the sum of the units (III) and (IV) being from 0% to 99%. Preferably, the molar percentage of units (III) relative to the sum of the units (III) and (IV) may be greater than or equal to 55% and/or less than or equal to 95%. More preferably, it may be greater than or equal to 60% and/or less than or equal to 85%. Very preferably, it may be greater than or equal to 65% and/or less than or equal to 75%.

In certain embodiments, said at least one polyaryl ether ketone may be a polymer consisting essentially of, or consisting of:

a repeat unit of formula:

(III)

and a repeat unit of formula:

(V)

the molar percentage of units (III) relative to the sum of the units (III) and (V) being from 0% to 99%. Preferably, the molar percentage of units (III) relative to the sum of the units (III) and (V) may be greater than or equal to 5% and/or less than or equal to 97%. More preferably, it may be greater than or equal to 40% and/or less than or equal to 96%. Very preferably, it may be greater than or equal to 70% and/or less than or equal to 95%.

In some embodiments, said at least one PAEK has a viscosity index, measured as a solution at 25° C. in aqueous sulfuric acid solution at 96% by mass, according to the standard ISO 307: 2019, of from 0.65 dl/g to 1.15 dl/g. Preferably, the viscosity index may be greater than or equal to 0.85 dl/g and/or less than or equal to 1.13 dl/g. More preferably, it may be greater than or equal to 0.92 dl/g and/or less than or equal to 1.12 dl/g.

In some embodiments, the pulverulent composition may have a particle size distribution such that the median diameter $d_{50}$ of the distribution is such that: $d_{50}<100$ μm. Preferably, the particle size distribution is such that: 40 μm$<d_{50}<80$ μm. More preferably, the particle size distribution is such that: $d_{10}>15$ μm, 40 μm$<d_{50}<80$ μm, and $d_{90}<240$ μm.

In some embodiments, said at least one polyaryl ether ketone may represent at least 50%, or at least 60%, or at least 65%, or at least 75%, or at least 85%, or at least 90%, or at least 95%, or at least 99% by weight relative to the total weight of the composition. In particular embodiments, the pulverulent composition may notably consist essentially, or may consist, of said at least one polyaryl ether ketone.

In some embodiments, the pulverulent composition according to the invention may comprise, or may consist essentially of, or may consist of, a first powder P1 and a second powder P2, the powders P1 and P2 being based, independently or not of one another, on said at least one PAEK. In these embodiments, the powder P1 may have at least one endothermic peak with a peak temperature strictly greater than 280° C., preferably greater than or equal to 290° C., and does not possess any endothermic peak with a peak temperature of less than or equal to 280° C. The powder P2 may have at least one endothermic peak with a peak temperature equal to a value of 200° C. to 280° C., and preferably greater than or equal to 220° C. and/or less than or equal to 275° C.

In some embodiments, the powder P1 may comprise, or essentially consist of, or consist of a powder obtained by heat treatment at a temperature greater or equal to 265° C., of an initial powder which has at least one endothermic peak having a temperature strictly greater than 280° C. and an endothermic peak having a peak temperature of from 200° C. to 280° C. The initial powder may notably be powder P2.

In some embodiments, P1 may comprise, or essentially consist of, or consist of a powder obtained by a method for layer-by-layer construction by sintering of an initial powder or initial pulverulent composition, which has at least one endothermic peak having a temperature strictly greater than 280° C., at a construction temperature of greater than or equal to 265° C. The initial pulverulent composition may be the composition according to the invention.

Advantageously, the powder P1 and the powder P2 may have essentially the same chemical composition and/or essentially the same viscosity index and/or essentially the same particle size distribution.

In some embodiments, the powder P2 may represent 1% to 39% by weight relative to the total weight of the powders P1 and P2. Preferably, the powder P2 may represent 3% or more and/or 30% or less by weight relative to the total weight of the powders P1 and P2. More preferably, it may represent 4% or more and/or 20% or less by weight. Very preferably, it may represent 5% or more and/or 15% or less by weight. Where appropriate, the powder P2 may represent not more than 38% by weight, or not more than 35% by weight, or else not more than 30% by weight, relative to the total weight of the powders P1 and P2.

In some embodiments, the powder P1 and the powder P2 may have, independently or not independently of each other, a tapped density of from 200 to 550 kg/m$^3$. Preferably, the powder P1 and the powder P2 may have, independently or not independently of each other, a tapped density of from 250 to 510 kg/m$^3$. More preferably, they may have, independently of each other, a tapped density of from 300 to 480 kg/m$^3$.

The present invention also relates to a kit to make a pulverulent composition according to the invention. The kit comprises the above mentioned powder P1 and powder P2.

The present invention also relates to a method for determining a minimum construction temperature Tc for the layer-by-layer construction of a three-dimensional object by sintering, caused by electromagnetic radiation, of a pulverulent composition.

This method comprises providing a thermogram by differential scanning calorimetry of the pulverulent composition on first heating and using a temperature ramp of 20° C./minute. The minimum temperature is determined by integration of the thermogram between 225° C. and Tc, to obtain a partial enthalpy equal to a value from 3.0 J/g to 7.0 J/g, preferably equal to a value of around 5 J/g. Alternatively, the minimum temperature is determined by integration of the thermogram between 225° C. and Tc to obtain a partial enthalpy from 8.0% to 20.0% relative to the total enthalpy, preferably equal to around 14% relative to the total enthalpy.

The present invention also relates to a process for layer-by-layer construction of a three-dimensional object by sintering, caused by electromagnetic radiation, of the pulverulent composition described above, carried out at the minimum construction temperature as estimated by the method presented above.

Finally, the present invention relates to an object which may be obtained, or which is obtained directly, by the construction process presented above.

LIST OF FIGURES

The invention will be understood more clearly with regard to the detailed description that follows of non-limiting embodiments of the invention and to the following figures.

DETAILED DESCRIPTION OF THE INVENTION

Definitions

The term "powder" refers to a fractional state of matter, which is generally in the form of small pieces (particles) of very small size, generally of about a hundred micrometres or less. The term "pulverulent" refers to a composition which is as a whole in the form of a powder.

The thermograms to which reference is made in the present application are obtained by differential scanning calorimetry (DSC) according to the standard NF EN ISO 11357-3:2018, on first heating, of about 10 mg of test composition, and using a temperature ramp of 20° C./minute. The initial temperature may notably be about 20° C. and the final temperature may be about 390° C. The thermograms may be produced, for example, like those presented in the figures, using a Q2000 differential scanning calorimeter, sold by the company TA Instruments.

In the light of the standard NF EN ISO 11357-3:2018, the term "melting point" denotes the temperature at which an at least partially crystalline composition changes to the viscous liquid state. Unless otherwise indicated, it is more particularly the peak melting point, and, where appropriate, the temperature of the highest-temperature peak in the case where several endothermic peaks are present. The term "enthalpy of fusion" denotes the heat required to make the composition melt.

Unless otherwise mentioned, the definitions of the standard ISO 11357-1 2016 apply to the present invention. In particular, the following terms are defined as follows:

a "peak" denotes the part of the DSC curve which separates from the baseline of the specimen to reach a maximum or a minimum, and then which returns to the baseline of the specimen. A peak in the DSC curve may notably indicate a first-order transition;

an "endothermic peak" denotes a peak for which the flow of heat supplied to the crucible of the specimen is higher than that of the reference crucible. This corresponds to a transition which absorbs heat;

a "baseline" denotes the part of the recorded curve without any transition, notably in this case without any first-order transition of melting type. In a transition zone, a virtual baseline may be determined: this is an imaginary line plotted through the transition zone, assuming that the heat due to the transition is zero. The virtual baseline may be plotted by interpolating the baseline of the specimen by means of a straight line;

a "peak area" denotes the area delimited by the peak and the interpolated virtual baseline. It is likened to an enthalpy of transition, which may be expressed in J/g. In the present invention, the enthalpies are obtained by integration of the peaks relative to the baseline from a temperature of 225° C. up to a given temperature, for example 280° C.("partial enthalpy") or 330° C. ("total enthalpy"). In the present invention, the unit J/g shall be understood as "joule" per "gram of the at least one polyaryl ether ketone". This is notably of importance when the composition does not consist of the at least one polyaryl ether ketone, for example when the composition contains fillers.

an "interpolated initial temperature" denotes the point of intersection of the interpolated virtual baseline and of the tangent to the point of inflection of the peak start;

a "peak temperature" denotes the temperature at which the distance is greatest between the DSC curve and the virtual baseline in the course of a peak;

an "interpolated final temperature" denotes the point of intersection of the interpolated virtual baseline and of the tangent to the point of inflection of the peak end;

The term "glass transition temperature", written as Tg, is intended to denote the temperature at which an at least partially amorphous polymer passes from a rubbery state to a glassy state, or vice versa, as measured by differential scanning calorimetry (DSC) according to the standard NF ISO 11357-2: 2013 using a heating rate of 20° C./min.

The rules for the representation of results of a particle size distribution are given by the standard ISO 9276—parts 1 to 6. The term "$d_{50}$" means the powder particle diameter value such that the cumulative volume-weighted particle diameter distribution function is equal to 50%. The value of "$d_{50}$" is measured by laser diffraction according to the standard ISO 13320: 2009, for example using a Malvern Mastersizer 2000® diffractometer. Similarly, "$d_{10}$" and "$d_{90}$" are, respectively, the corresponding diameters such that the cumulative volume-weighted particle diameter function is equal to 10% and, respectively, to 90%.

The term "tapped density" (dimensionless) or "tapped volume per unit mass" ($kg/m^3$) means the density/volume per unit mass of a pulverulent material following the compacting or tapping of this material. The tapped density is measured with reference to the standard ISO 1068-1975 (F) in the following manner:

A volume of powder is introduced into an accurate graduated 250 ml glass measuring cylinder;

If necessary, the free surface of the powder is levelled, without tapping it, and the volume $V_0$ is recorded;

The measuring cylinder with the powder is weighed on a balance with an accuracy of 0.1 g, which has been tared beforehand;

The measuring cylinder is placed on the plate of the STAV 2003 tapping machine;

It is tapped by dropping 1250 times, and the volume V1 is recorded;

It is tapped by dropping 1250 times, and the volume V2 is recorded;

The tapping operation is repeated until two equivalent volumes Vi are obtained. Vf corresponding to the identical volumes Vi is recorded.

The tapped density is the mass of powder introduced divided by Vf. The bulk density is the mass of powder introduced divided by V0. The tapped and bulk densities are both expressed in $kg/m^3$.

The term "flowability" is intended to denote the ability of a powder to flow freely in a uniform and constant manner in the form of individual particles. The flowability is herein measured according to method "A" of the standard ISO 6186:1998, with a funnel having an aperture 25 mm in diameter, via which the pulverulent composition can flow. Incidentally, no antistatic agent is added to the composition. The flowability is measured in seconds(s).

The term "viscosity index" is intended to denote the viscosity as measured in solution at 25° C. in aqueous sulfuric acid solution at 96% by mass, according to the standard ISO 307:2019. The viscosity index is expressed in dl/g.

The term "polymer blend" is intended to denote a macroscopically homogeneous polymer composition. The term also covers such compositions composed of mutually immiscible phases dispersed at the micrometric scale.

The term "copolymer" is intended to denote a polymer derived from the copolymerization of at least two chemically different types of monomer, referred to as comonomers. A copolymer is thus formed from at least two repeating units. It may also be formed from three or more repeating units.

The abbreviation "PAEK" corresponds to the term "polyaryl ether ketone", "PAEKs" corresponds to the term "polyaryl ether ketones" and "PAEK(s)" corresponds to the term "polyaryl ether ketone(s)".

The singular forms "a(n)" or, respectively, "the", mean by default: "at least one" and, respectively "said at least one" (the latter wordings are not always used so as to make certain turns of phrase more readable), unless otherwise mentioned. In all the ranges set out in the present patent application, the limits are included, unless otherwise mentioned.

Polyaryl Ether Ketone

A polyaryl ether ketone (PAEK) includes repeating units having the following formulae:

$$(-Ar-X-) \text{ and } (-Ar_1-Y-),$$

in which:

Ar and $Ar_1$ each denote a divalent aromatic radical;

Ar and $Ar_1$ may preferably be chosen from 1,3-phenylene, 1,4-phenylene, 1,1'-biphenylene divalent in positions 3,3',1,1'-biphenyl divalent in positions 3,4',1,4-naphthylene, 1,5-naphthylene and 2,6-naphthylene;

X denotes an electron-withdrawing group; it may preferably be chosen from the carbonyl group and the sulfonyl group;

Y denotes a group chosen from an oxygen atom, a sulfur atom or an alkylene group, such as —(CH)$_2$— and isopropylidene.

In these units X and Y, at least 50%, preferably at least 70% and more particularly at least 80% of the groups X are a carbonyl group, and at least 50%, preferably at least 70% and more particularly at least 80% of the groups Y represent an oxygen atom.

According to a preferred embodiment, 100% of the groups X denote a carbonyl group and 100% of the groups Y represent an oxygen atom.

Advantageously, the PAEK(s) may be chosen from:
a polyether ketone ketone, also known as PEKK; a PEKK comprises one or more repeat units of formula: —Ph—O—Ph—C(O)—Ph—C(O)—;
a polyether ether ketone, also known as PEEK; a PEEK comprises one or more repeat units of formula: —Ph—O—Ph—O—Ph—C(O)—;
a polyether ketone, also known as PEK; a PEK comprises one or more repeat units of formula: —Ph—O—Ph—C(O)—;
a polyether ether ketone ketone, also known as PEEKK; a PEEKK comprises one or more repeat units of formula: —Ph—O—Ph—O—Ph—C(O)—Ph—C(O)—;
a polyether ether ether ketone, also known as PEEEK; a PEEEK comprises one or more repeat units of formula: —Ph—O—Ph—O—Ph—O—Ph—C(O)—;
a polyether diphenyl ether ketone, also known as PEDEK; a PEDEK comprises one or more repeat units of formula: —Ph—O—Ph—Ph—O—Ph—C(O)—;
and mixtures thereof; and
copolymers comprising at least two of the abovementioned repeat units, in which: Ph represents a phenylene group and —C(O)— represents a carbonyl group, each of the phenylenes possibly being, independently, of the ortho (1-2), meta (1-3) or para-(1-4) type, preferentially being of meta or para type.

In addition, defects, end groups and/or monomers may be incorporated in very small amount into the polymers as described in the above list, without, however, having an incidence on their performance.

In particular embodiments, the PAEK is a PEKK essentially consisting of, or consisting of, a terephthalic repeating unit and an isophthalic repeating unit, the terephthalic repeating unit having the formula:

(I)

the isophthalic repeating unit having the formula:

(II)

For a polymer of a given family, such as the PEKK family, the term "essentially consisting of repeating unit(s)" means that the repeating unit(s) represent a molar proportion of from 95% to 99.9% in the polymer. In addition, the term "consisting of repeating unit(s)" means that the repeating unit(s) represent a molar proportion of at least 99.9%, ideally of 100%, in the polymer.

The choice of the molar proportion of T units, relative to the sum of the T and I units, is one of the factors which makes it possible to adjust the rate of crystallization of the polyether ketone ketones.

A given molar proportion of T units, relative to the sum of the T and I units, may be obtained by adjusting the respective concentrations of the reagents during the polymerization, in a manner known per se.

The molar proportion of T units relative to the sum of the T and I units of PEKK may notably range from: 0 to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 48%; or from 48% to 51%; or from 51% to 54%; or from 54% to 58%; or from 58% to 60%; or from 60% to 62%, or from 62% to 64%; or from 64% to 68%; or from 68% to 72%; or from 72% to 75%; or from 75% to 80%; or from 80% to 85%.

In the embodiments in which the polyether ketone ketone is a copolymer, it is advantageously a copolymer of statistical type.

In particular embodiments, the polyether ketone ketone consists essentially, or even consists, of "T" and "I" units, with a molar proportion of T units relative to the sum of the T and I units ranging from 45% to 75%. The molar proportion of T units relative to the sum of the T and I units is preferably greater than or equal to 48% and more preferably greater than or equal to 58%. The molar proportion of T units relative to the sum of the T and I units is also preferably less than or equal to 72% and more preferably less than or equal to 64%. The molar proportion of T units relative to the sum of the T and I units may notably be equal to around 60%.

In particular embodiments, the PAEK is a polymer consisting essentially of, or even consisting of:
a repeat unit of formula:

(III)

and a repeat unit:

(IV)

The molar proportion of units (III) relative to the sum of the units (III) and (IV) may range from 0% to 99%. The molar proportion of units (III) relative to the sum of the units (III) and (IV) is preferentially greater than or equal to 55% and more preferentially greater than or equal to 60%. It is also preferentially less than or equal to 95%, and more preferentially less than or equal 85%.

In the embodiments in which the polymer is a copolymer, it is advantageously a copolymer of statistical type.

In particular embodiments, the PAEK is a polymer consisting essentially of, or even consisting of:

a repeating unit of formula:

(III)

and a repeating unit of formula:

(V)

The molar proportion of units (III) relative to the sum of the units (III) and (V) may range from 0% to 99%. The molar proportion of units (III) relative to the sum of the units (III) and (V) is preferentially greater than or equal to 5%, more preferentially greater than or equal to 40%, and very preferentially greater than or equal to 70%. It is also preferentially less than or equal to 97%, more preferentially less than or equal to 96%, and very preferentially less than or equal to 95%. In the embodiments in which the polymer is a copolymer, it is advantageously a copolymer of statistical type.

Powder Based on at Least One Polyaryl Ether Ketone

The (at least one) powder based on at least one polyaryl ether ketone used in the pulverulent composition according to the invention generally comprises at least 50% by weight of a PAEK or of a mixture of PAEKs, relative to the total weight of powder.

In certain embodiments, the powder comprises at least 60%, or at least 65%, or at least 70%, or at least 75%, or at least 80%, or at least 85%, or at least 90%, or at least 92.5%, or at least 95%, or at least 97.5%, or at least 98%, or at least 98.5%, or at least 99%, or at least 99.5% by weight of PAEK(s) relative to the total weight of powder.

In certain variants, the powder may consist essentially, or may consist, of PAEK(s). For the powders/pulverulent compositions, the term "consists essentially of a constituent" means that said constituent represents a mass proportion of from 95% to 99.9% relative to the total weight of powder/pulverulent composition. In addition, the term "consists of a constituent" means that said constituent represents a mass proportion of greater than 99.9%, ideally 100%, relative to the total weight of powder/pulverulent composition.

In certain embodiments, the PAEK-based powder may comprise only one PAEK, for example only one PEKK polymer and no other type of PAEK. Alternatively, the PAEK-based powder may comprise at least two different types of PAEK, for example a mixture of PEKK and a polymer consisting essentially, or even consisting, of units (III) and (IV) or a mixture of PEKK and a polymer consisting essentially, or even consisting, of units (III) and (V).

In certain embodiments, the PAEK-based powder may comprise only one PAEK having a given chemical composition, for example only PEKK polymer consisting of terephthalic and isophthalic repeat units having a T:I mole ratio of 60:40, and no other type of PAEK. Alternatively, the PAEK-based powder may comprise only one PAEK, but with different chemical compositions, for example a mixture of PEKK having a T:I mole ratio of 60:40 and a PEKK having a T:I mole ratio of 50:50 or else a mixture of PEKK having a T:I mole ratio of 60:40 and a PEKK having a T:I mole ratio of 55:45.

In certain embodiments, the powder has a viscosity index, measured as a solution at 25° C. in aqueous sulfuric acid solution at 96% by mass according to the standard ISO 307: 2019, of from 0.65 dl/g to 1.15 dl/g, preferentially from 0.85 dl/g to 1.13 dl/g and more preferably from 0.92 dl/g to 1.12 dl/g. These viscosity indices are particularly advantageous and make it possible to obtain a good compromise to have both good coalescence properties during sintering (sufficiently low viscosity) and good mechanical properties of the sintered object (sufficiently high viscosity).

The powder may be obtained by milling polymer flakes or extruded granules according to techniques known to those skilled in the art.

The milling of polymer flakes or of extruded granules may be performed at a temperature below −20° C., preferentially at a temperature below −40° C., by cooling with liquid nitrogen, or liquid carbon dioxide, or cardice, or liquid helium. In other embodiments, notably in the case of polymer flakes, the milling may be performed at room temperature, i.e. at a temperature that may notably be from 15° C. to 35° C., for example 25° C.

The powder may have a particle size distribution having a median diameter $d_{50}$ of the distribution such that: $d_{50}<100$ μm. Preferentially, the $d_{50}$ is such that: $40<d_{50}<80$. In more preferred embodiments, the particle size distribution is such that $d_{10}>15$ μm, $40<d_{50}<80$ μm, and $d_{90}<240$ μm. In certain embodiments, $d_{90}<220$ μm or even $d_{90}<200$ μm. These particle size distributions are particularly advantageous for powders/pulverulent compositions intended to be used in a sintering process.

The powder may have a tapped density of from 200 to 550 kg/m³.

The tapped density may be preferentially greater than or equal to 250 kg/m³ and more preferentially greater than or equal to 300 kg/m³. The tapped density may also preferentially be less than or equal to 510 kg/m³ and more preferentially less than or equal to 480 kg/m³.

Pulverulent Composition

The pulverulent composition according to the invention generally comprises at least 50% by weight of PAEK-based powder(s).

In some embodiments, the (at least one) PAEK-based powder represents at least 55% by weight, or at least 60% by weight, or at least 65% by weight, or at least 70% by weight, or at least 75% by weight, or at least 80%, or at least 85% by weight, or at least 90% by weight, or at least 95% by weight, or at least 99% by weight relative to the total weight of the composition.

In certain variants, the composition may consist essentially, or may consist, of PAEK-based powder.

In certain variants, the PAEK-based powder(s)/the pulverulent composition may comprise one or more other polymers not belonging to the PAEK family, notably another thermoplastic polymer, for instance a polyetherimide (PEI).

The PAEK-based powder(s)/pulverulent composition may comprise one or more additives. The additives generally represent less than 5% by weight relative to the total weight of the PAEK-based powder(s)/pulverulent composition. Preferably, the additives represent less than 1% by weight relative to the total weight of PAEK-based powder(s)/pulverulent composition. Among the additives, mention may be made of flow agents, stabilizers (light, in particular UV, and heat stabilizers), optical brighteners, dyes, pigments and energy-absorbing additives (including UV absorbers).

In certain embodiments, the PAEK-based powder(s)/the pulverulent composition comprises a phosphate. The phosphate may notably be a phosphate salt, for instance a salt of $H_2PO_4^-$, $HPO_4^{2-}$, $PO_4^{3-}$, or a mixture thereof, preferentially having a sodium ion, a potassium ion or a calcium ion as counterion. Advantageously, the phosphate is incorporated into PAEK-based powder(s)/the composition in a proportion of greater than or equal to 500 ppm, or greater than or equal to 750 ppm, or greater than or equal to 1000 ppm, or greater than or equal to 1500 ppm, or greater than or equal to 2000 ppm, or greater than or equal to 2500 ppm.

In certain embodiments, the pulverulent composition comprises a flow agent, for example a hydrophilic or hydrophobic silica. Advantageously, the flow agent represents from 0.01% to 0.4% by weight relative to the total weight of the composition.

In other embodiments, the pulverulent composition does not comprise any flow agent.

The PAEK-based powder(s)/pulverulent composition may also comprise one or more fillers. The fillers represent less than 50% by weight and preferably less than 40% by weight relative to the total weight of the composition. Among the fillers, mention is made of reinforcing fillers, notably mineral fillers such as carbon black, talc, carbon or non-carbon nanotubes, fibres (glass, carbon, etc.), which may or may not be milled.

Certain polymers other than PAEK(s), and certain additives and/or certain reinforcing fillers may be incorporated into the PAEK(s), for example by melt extrusion by compounding and then milling granules, in order to form the PAEK-based powder(s) incorporating these other constituents.

Certain polymers other than PAEK(s), and/or certain additives and/or certain reinforcing fillers may be dry-blended with the PAEK-based powder(s), in order to be incorporated to the pulverulent composition.

The pulverulent composition according to the invention is characterized by a DSC thermogram whose characteristics make it possible to envisage electromagnetic radiation-mediated sintering at a construction temperature lower than that of the conventional sintering processes of the prior art.

The thermogram of the composition comprises at least two endothermic peaks. It comprises a first endothermic peak having a peak temperature strictly greater than 280° C., preferentially greater than or equal to 290° C. It also comprises a second endothermic peak, having a peak temperature equal to a value of from 200° C. to 280° C., preferentially having a peak temperature greater than or equal to 220° C. and/or less than or equal to 275° C.

The enthalpy measured on the thermogram of the composition between 225° C. and 280° C. may represent from 15% to 50% of the total enthalpy measured between 225° C. and 330° C. on said thermogram.

Preferentially, the enthalpy measured on the thermogram of the composition between 225° C. and 280° C. may represent 20% or more of the total enthalpy measured between 225° C. and 330° C. on said thermogram. It also preferentially may represent 40% or less of the total enthalpy.

The enthalpy measured between 225° C. and 280° C. may notably be from 5 J/g to 20 J/g.

Preferentially, the enthalpy measured between 225° C. and 280° C. may be greater than or equal to 7 J/g, and more preferentially be greater than or equal to 8 J/g. It may also preferentially be less than or equal to 14 J/g, and more preferentially less than or equal to 12 J/g.

In certain embodiments, the composition may have a flowability of less than or equal to 15 seconds, and more preferably of less than or equal to 10 seconds. The composition may notably have a flowability of less than or equal to 9 seconds, or of less than or equal to 7 seconds.

According to some embodiments, the composition may be a primary composition.

According to some embodiments, the composition may be a refreshed composition.

The term "refreshing of the composition" as used herein refers to a composition composed of a composition part which has not been previously used in a laser sinter process and a composition part, which has been used in a laser sinter process at least once. Within the context of the present invention, a powder, respectively a composition, which has not been previously used in a laser sinter process is named "primary powder", and respectively "primary composition".

The embodiment below presents a particular non-limiting embodiment of implementation of a composition having such a thermogram. It is obvious that a person skilled in the art may be capable of considering certain other variations also covered by the present invention.

The PAEK-based powder may consist of a mixture comprising, or consisting essentially of, or consisting of, a first powder P1 and a second powder P2. The powders P1 and P2 are based on at least one PAEK.

The powder P1 has at least one endothermic peak with a peak temperature strictly greater than 280° C., and possesses no endothermic peak with a peak temperature of less than or equal to 280° C. Preferentially, the powder P1 may have an endothermic peak with a peak temperature of greater than or equal to 290° C.

In some embodiments, the powder P1 may comprise, or consist of, primary powder.

In some embodiments, the powder P1 may comprise, or consist of, a powder or pulverulent composition which has already been used at least once in a laser sintering process.

The powder P2 has at least one endothermic peak having a peak temperature of 200° C. to 280° C. Preferentially, the powder P2 may have at least one endothermic peak having a temperature of from 220° C. to 275° C. In preferred embodiments, the powder P2 may represent from 5% to 39% by weight, preferentially from 10% to 39% by weight, more preferentially from 15% to 39% by weight, and very preferably from 20% to 39% by weight, relative to the total weight of the powder P1 and of the powder P2. In certain variants, the powder P2 may represent not more than 38%, or not more than 35%, or not more than 30% by weight relative to the total weight of the powder P1 and of the powder P2.

The powders P1 and P2 may be based on two different PAEKs, or based on the same PAEK.

Advantageously, the powders P1 and P2 may be based on the same PAEK. For example, the powders P1 and P2 may be based on a PEKK, or on a polymer consisting essentially of, or consisting of, repeating units of formulae (III) and (IV), or on a polymer consisting essentially of, or consisting of, repeating units of formulae (III) and (V). Herein below, it is considered that the powders P1 and P2 consist essentially of, or consist of, a single PAEK, for example a PEKK.

The powders P1 and P2 may have a different chemical composition, i.e., in the case of PEKK, they may have a different T:I ratio, and/or the powders P1 and P2 may have a different viscosity index, and/or the powders P1 and P2 may have a different particle size distribution.

Alternatively, the powders P1 and P2 may have the same chemical composition, substantially the same viscosity index and substantially the same particle size distribution.

The powders P1 and P2 of the pulverulent composition may notably be derived from the same initial powder P. In this embodiment, the powder P has at least one endothermic peak having a temperature strictly greater than 280° C. and an endothermic peak having a peak temperature of from 200° C. to 280° C. In particular embodiments, the powder P may be, for example, a PEKK powder such as a KEPSTAN® 6002 PL powder sold by Arkema.

The powder P may be heat-treated in order to obtain the powder P1. The heat treatment involves heating the powder P at a temperature of greater than or equal to 265° C., preferentially at a temperature of greater than or equal to 270° C. and very preferably at a temperature of greater than or equal to 275° C., for a sufficient time. The powder P may notably be heated to a temperature from 1 to 25° C. below its melting point, preferentially to a temperature 10° C. to 25° C. and very preferably to a temperature from 15° C. to 25° C. below its melting point. A sufficient duration for this treatment, is generally 6 hours or less and preferentially 4 hours or less. The powder P2 may be derived directly from the powder P. Alternatively, the powder P may undergo other treatments in order to obtain the powder P2 but not at a temperature exceeding 260° C. and preferably not a heat treatment at a temperature exceeding 250° C.

Method for Estimating the Minimum Construction Temperature

The minimum construction temperature at which a pulverulent composition, notably the composition according to the invention, may be sintered can be estimated by determining the area of the endothermic peaks in the thermogram of the composition.

The temperature range over which the area of the peaks is integrated is generally between 225° C. and 330° C. The enthalpy measured over this range corresponds to the "total" enthalpy.

The minimum construction temperature corresponds to the temperature at which the measured enthalpy, on commencing the integration of the thermogram at 225° C., represents from 8.0% to 20.0% of the total enthalpy. The measured enthalpy may notably represent from 8.0% to 9.0%, or from 9.0% to 10.0%, or from 10.0% to 11.0%, or from 11.0% to 12.0%, or from 12.0% to 13.0%, or from 13.0% to 14.0%, or from 14.0% to 15.0%, or from 15.0% to 16.0%, or from 16.0% to 17.0%, or from 17.0% to 18.0%, or from 18.0% to 19.0%, or from 19.0% to 20.0% of the total enthalpy. The measured enthalpy may notably represent about 14.0% of the total enthalpy.

Alternatively or in addition, the minimum construction temperature may correspond to the temperature at which the measured enthalpy represents an enthalpy equal to 3.0 J/g to 7.0 J/g, preferentially equal to 5.0 J/g, on commencing the integration of the thermogram at 225° C.

Without wishing to be bound to the theory, the inventors think that, at this temperature, the composition is heated to an optimum temperature so as to have sufficient cohesion of the powder bed. This generally makes it possible to dispense with the need for a support to maintain the object under construction in the powder bed. This cohesion is not, however, too high, which would have a negative impact on the recovery and recyclability of unsintered composition and also on the surface of the constructed object (granular appearance).

Sintering Process

Figure 1:
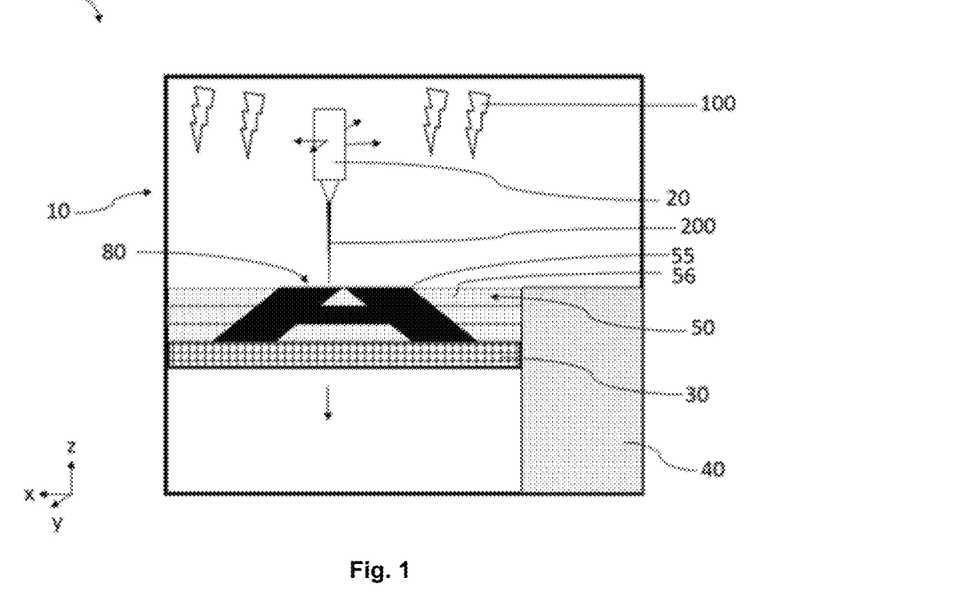
FIG. 1 schematically shows a device for carrying out the process for manufacturing, at a construction temperature Tc, a three-dimensional object layer-by-layer by sintering, in which a composition according to the invention may advantageously be used.

The pulverulent composition, as described above, is used in a process for the electromagnetic radiation-mediated layer-by-layer sintering construction of a three-dimensional object in a device 1, such as the one shown diagrammatically in FIG. 1.

The electromagnetic radiation may be, for example, infrared radiation, ultraviolet radiation or, preferably, laser radiation. In particular, in a device 1 such as the one shown diagrammatically in FIG. 1, the electromagnetic radiation may comprise a combination of infrared radiation 100 and laser radiation 200.

The sintering process is a layer-by-layer manufacturing process for constructing a three-dimensional object 80.

The device 1 comprises a sintering chamber 10 in which are placed a feed tank 40 containing the PAEK-based pulverulent composition and a movable horizontal plate 30. The horizontal plate 30 may also act as a support for the three-dimensional object 80 under construction. Nevertheless, the objects manufactured from the pulverulent composition according to the invention generally do not need an additional support and can generally be self-supported by the unsintered pulverulent composition of preceding layers.

According to the process, pulverulent composition is taken from the feed tank 40 and deposited on the horizontal plate 30, forming a thin layer 50 of pulverulent composition constituting the three-dimensional object 80 under construction. The layer of pulverulent composition 50 is heated by means of an infrared radiation 100 to reach a substantially uniform temperature equal to the predetermined minimum construction temperature Tc.

The energy required to sinter the particles of pulverulent composition at various points in the layer of powder 50 is then provided by a laser radiation 200 of the mobile laser 20 in the plane (xy), according to a geometry corresponding to that of the object. The molten pulverulent composition resolidifies forming a sintered part 55, whereas the rest of the layer 50 remains in the form of unsintered pulverulent composition 56. A single pass of a single laser radiation 200 is generally sufficient to ensure the sintering of the pulverulent composition. Nevertheless, in certain embodiments, several passes at the same place and/or several electromagnetic radiations reaching the same place may also be envisaged to ensure the sintering of the pulverulent composition.

Next, the horizontal plate 30 is lowered along the axis (z) by a distance corresponding to the thickness of a layer of pulverulent composition, and a new layer is deposited. The laser 20 supplies the energy required to sinter the particles of pulverulent composition in a geometry corresponding to this new slice of the object, and so on. The procedure is repeated until the entire object 80 has been manufactured.

The temperature in the sintering chamber 10 of the layers under the layer undergoing construction may be below the construction temperature. However, this temperature generally remains above, or even well above, the glass transition temperature of the pulverulent composition. It is notably advantageous for the temperature of the base of the chamber to be maintained at a temperature Tb, known as the "tank bottom temperature", such that Tb is less than Tc by less than 40° C., preferably by less than 25° C. and more preferably by less than 10° C.

Once the object 80 has been completed, it is removed from the horizontal plate 30 and the unsintered pulverulent composition 56 can be screened before being returned, at least partly, into the feed tank 40 to serve as recycled powder. Recycling of the pulverulent composition is made possible by the fact that the construction temperature Tc is generally below that of conventional construction processes, which makes it possible to attenuate the ageing of the unsintered pulverulent composition which has been subjected to the temperature conditions of at least one sintering construction. The recycled pulverulent composition may be used as such or alternatively as a mixture with fresh powder.

In particular, in embodiments in which the composition according to the invention consists of a mixture of a powder P1 and of a powder P2, the construction temperature is lower than that which would be used for a conventional construction process using a composition consisting of powder P1 (which is not according to the invention). This makes it possible to envisage improved recycling of unsintered pulverulent composition into a subsequent construction. The unsintered pulverulent composition may have at least one endothermic peak with a peak temperature strictly greater than 280° C. and no endothermic peak having a peak temperature of less than or equal to 280° C. Advantageously, it may be mixed with fresh powder P and/or fresh powder P2, so as to obtain a refreshed pulverulent composition. The refreshed pulverulent composition still have a construction temperature Tc which is below that of the conventional construction processes.

Object Which May be Obtained or Which is Directly Obtained by the Sintering Process The object which may be obtained or which is directly obtained by the sintering process according to the invention has mechanical properties at least similar to those of the objects obtained via conventional sintering processes and/or a better surface appearance.

In particular, in embodiments in which the composition according to the invention consists of a mixture of a powder P1 and of a powder P2, the mechanical properties of the object obtained via the process according to the invention are similar to those of an object which would be obtained via a conventional construction process using a composition consisting of powder P1 (which is not according to the invention).

In particular, in embodiments in which the composition according to the invention consists of a mixture of a powder P1 and of a powder P2, the surface appearance of the object obtained via the process according to the invention is at least similar to, if not better than, that of an object which would be obtained via a conventional construction process using a composition consisting of powder P1 (which is not according to the invention).

EXAMPLES

Example 1

Manufacture of a PEKK Polymer

A PEKK polymer, consisting of terephthalic and isophthalic repeating units, with a mole ratio of terephthalic units relative to the isophthalic units of 60:40, was manufactured as follows:

Ortho-dichlorobenzene and 1,4-(phenoxybenzoyl)benzene (EKKE) were placed in a 2 L reactor with stirring and under a stream of nitrogen.

An acyl chloride mixture consisting of: terephthaloyl chloride, isophthaloyl chloride and benzoyl chloride, was then added to the reactor. The reactor was cooled to −5° C.

Aluminum trichloride $AlCl_3$ was added while keeping the temperature in the reactor below 5° C. After a homogenization period of about 10 minutes, the reactor temperature was increased by 5° C. per minute up to a temperature of 90° C. (it is considered that the polymerization begins during the temperature increase). The reactor was maintained at 90° C. for 30 minutes and then cooled to 30° C. Concentrated hydrochloric acid solution (3.3% by weight of HCl) was then added slowly so that the temperature in the reactor did not exceed 90° C. The reactor was stirred for 2 hours and then cooled to 30° C.

The PEKK thus formed was separated from the liquid effluents and then washed in the presence or absence of acid according to the usual separation/washing techniques that are well known to those skilled in the art, so as to obtain a "purified wet PEKK".

The purified wet PEKK was dried at 190° C. under vacuum (30 mbar) overnight. Polymer flakes were obtained. A viscosity index of 0.93 dl/g was measured as a solution at 25° C. in aqueous sulfuric acid solution at 96% by mass according to the standard ISO 307: 2019.

Example 2

Manufacture of P2 Powder

The polymer flakes obtained in Example 1 were micronized in an Alpine Hosokawa AFG 200 air jet mill at a temperature of 23° C. in order to obtain a powder P2 having as particle size distribution, $d_{10}=21$ microns, $d_{50}=50$ microns and $d_{90}=98$ microns, in a yield of 98%.

Figure 2:
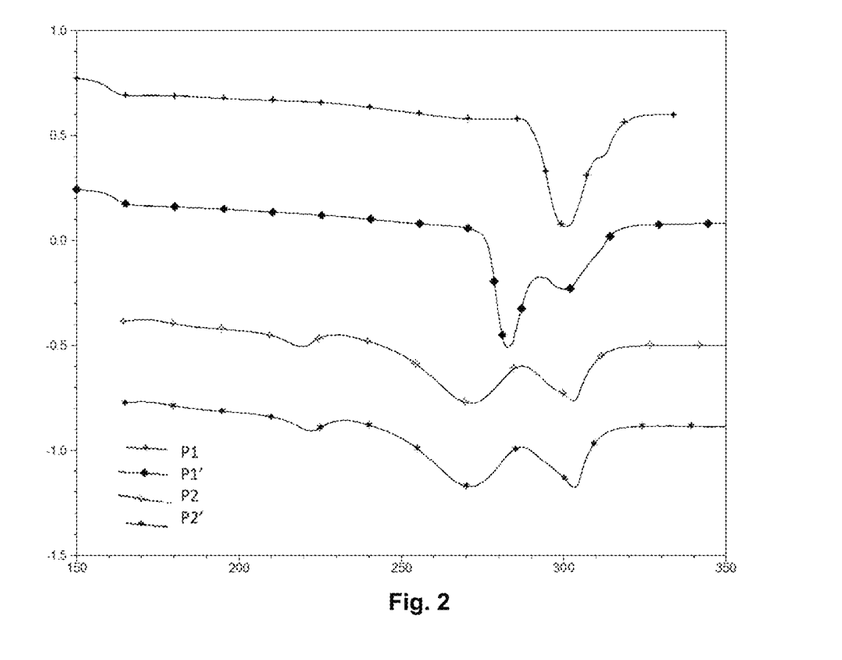
FIG. 2 shows the DSC thermograms of powders (from top to bottom): i) P1, ii) P1', iii) P2' and iv) P2. The thermograms are obtained by differential scanning calorimetry (DSC) according to the standard NF EN ISO 11357-3:2018, on first heating, using a temperature ramp of 20° C./minute. The x-axis represents the temperature, expressed in ° C., and the y-axis represents the flow of heat, expressed in W/g.

With reference to the thermogram of P2 in FIG. 2, three endothermic peaks could be observed. More precisely, P2 has two endothermic peaks each having a peak temperature of between 200° C. and 280° C. and an endothermic peak having a peak temperature of greater than or equal to 280° C.

A tapped density of 340 kg/m³ was measured.

The powder P2 does not flow and therefore cannot be used alone in a laser sintering process.

Example 3

Manufacture of P2' Powder

The powder P2, which is termed "non-densified", was subjected to a thermomechanical treatment in a Henschel rapid mixer, with a speed at the paddle end of about 43 m/s, for 60 minutes. The powder was introduced at room temperature (about 23° C.). Since the rapid mixer was not temperature-regulated, the temperature during the mixing can rise by several degrees, or even tens of degrees Celsius, but nevertheless remains well below 140° C.

A powder P2' which is termed "densified" was thus obtained. A tapped density of 440 kg/m³ was measured.

The thermogram of P2' in FIG. 2 is similar to that of P2.

Example 4

Manufacture of P1 Powder

The powder P2' was subjected to a heat treatment of 285° C. for 4 hours in order to obtain the powder P1.

With reference to the thermogram of P1 in FIG. 2, only one endothermic peak (peak temperature: 301° C.) with a shoulder (peak temperature: 313° C.) was observed.

It is known practice from the prior art to use a powder such as the powder P1 in a laser sintering process.

Example 5

Manufacture of P1' Powder

The powder P2' was subjected to a heat treatment at 275° C. for 4 hours in order to obtain the powder P1'.

With reference to the thermogram of P1' in FIG. 2, two endothermic peaks each having a peak temperature of greater than or equal to 280° C. were observed.

Example 6

Powder Mixtures

The following powder mixtures were obtained by dry blending for 3 minutes in a Turbula® mixer at room temperature (23° C.).

The flowability was measured according to method "A" of the standard ISO 6186:1998, with a funnel having an aperture 25 mm in diameter, via which the pulverulent composition can flow, and without any antistatic agent.

The table below collates the flowability results for compositions having different mass proportions of powder P1 and of powder P2:

TABLE 1

|  | Mixture number | | | | | | | |
| --- | --- | --- | --- | --- | --- | --- | --- | --- |
|  | #1 | #2 | #3 | #4 | #5 | #6 | #7 | #8 |
| P1 (% by weight) | 100 | 99 | 95 | 90 | 80 | 70 | 60 | 50 |
| P2 (% by weight) | 0 | 1 | 5 | 10 | 20 | 30 | 40 | 50 |
| Flowability (s) | 5 | 5 | 6 | 6 | 7 | 9 | — | — |

The presence of 1% to 30% by weight of powder P2 in a composition consisting of powder P1 and of powder P2 makes it possible to observe a flowability sufficient for the composition to be able to be used in a laser sintering process. Above 40% by weight of powder P2, the composition no longer flows ("–" symbol) and therefore cannot be used in a laser sintering process.

The table below collates the flowability results for compositions having different mass proportions of powder P1 and of powder P2':

TABLE 2

| Mixture number | #9 | #10 |
| --- | --- | --- |
| P1 (% by weight) | 95 | 80 |
| P'2 (% by weight) | 5 | 20 |
| Flowability (s) | 6 | 6 |

The results in terms of flowability obtained with the use of the powder P2' are similar to those obtained with the use of the powder P2.

Example 7

Estimation of the Bath Temperature

Figure 3:
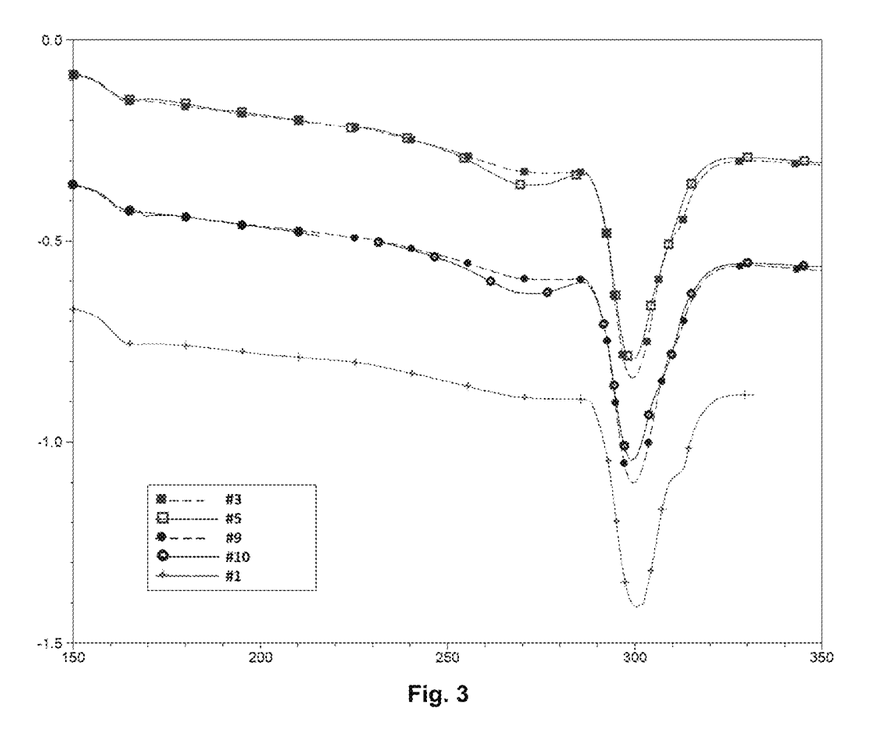
FIG. 3 shows the DSC thermograms of: (from top to bottom): i) a mixture P1:P2 (95:5) % by mass (in dotted lines), ii) a mixture P1:P2 (80:20) % by mass (in solid lines), iii) a mixture P1:P2' (95:5) % by mass (in dotted lines), iv) a mixture P1:P2' (80:20) % by mass (in solid lines) and v) P1 powder (in solid lines), obtained under the same conditions as those of FIG. 2. The x-axis represents the temperature, expressed in ° C., and the y-axis represents the flow of heat, expressed in W/g.

DSC thermograms were produced for the mixtures #1 to #10. The thermograms for the mixtures #1, #3, #9, #5 and #10 are shown in FIG. 3.

The peak melting point values ($T_{melting}$, expressed in ° C.), of total enthalpy integrating the area of the peaks relative to the baseline between 225° C. and 330° C. ($\Delta H_f$, expressed in J/g) and of partial enthalpy integrating the area of the peaks relative to the baseline between 225° C. and 280° C. ($\Delta H_p$, expressed in J/g) are given in the table below:

TABLE 3

| Mixture number | Melting peak temperature $T_{melting}$(° C.) | total enthalpy $\Delta H_f$ (J/g) | partial enthalpy | |
| --- | --- | --- | --- | --- |
| | | | $\Delta H_p$ (J/g) | $\Delta H_p/\Delta H_f$ *100 (%) |
| #1 | 301 shoulder 313 | 33.2 | 4.9 | 14.7 |
| #3 | 299 | 34.5 | 6.8 | 19.7 |
| #5 | 299 | 36.0 | 8.8 | 24.6 |
| #9 | 300 | 35.1 | 6.4 | 18.2 |
| #10 | 301 | 34.8 | 8.0 | 23.0 |

The minimum bath temperature $Tc_{min}$ was estimated in order to correspond to the temperature value for which a partial enthalpy of 5 J/g is measured by integration of the DSC spectrum from a temperature of 225° C.

The results are collated in the table below.

TABLE 4

| | Mixture number | | | | | | | | | |
| --- | --- | --- | --- | --- | --- | --- | --- | --- | --- | --- |
| | #1 | #2 | #3 | #4 | #5 | #6 | #7 | #8 | #9 | #10 |
| $Tc_{min}$ (° C.) | 279 | 275 | 274 | 273 | 270 | 268 | NCP | NCP | 272 | 268 |

The presence of 1% to 30% by weight of powder P2 in a composition consisting of powder P1 and of powder P2 makes it possible to reduce the construction temperature value of the construction process in comparison with the composition of mixture 1 consisting only of powder P1.

The presence of at least 5% of powder P2 makes it possible to reduce the construction temperature by at least 5° C. relative to the construction temperature of mixture 1.

The presence of at least 20% of powder P2 makes it possible to reduce the construction temperature by at least 9° C. relative to the construction temperature of mixture 1.

Example 8

Machine Test

Specimens of 1BA type, according to the standard ISO 527-2: 2012, are manufactured by laser sintering with the powder according to mixture #1 and with the powder according to mixture #5. They are constructed along the axes X and Y at the construction temperature $Tc_{min}$ of Table 3 and with a laser sintering energy of 28 mJ/mm$^2$.

The elastic modulus of the specimens may be measured at 23° C., with a throughput speed of 1 mm/minute, according to the standard ISO 527-2: 2012, using an MTS 810® machine sold by the company MTS Systems Corporation, equipped with a mechanical extensometer.

For the specimens manufactured using mixture #1 and for the specimens manufacture using mixture #5, a tensile elastic modulus of about 4 GPa may be measured, irrespective of their construction axis.

Since the specimen obtained from mixture #5 is manufactured at a construction temperature lower than that of the specimen obtained from mixture #1, the unsintered powder undergoes less ageing and can be recycled a larger number of times into subsequent sintering processes. In addition, the process for preparing the specimen derived from mixture #5 is faster than that for preparing the specimen derived from mixture #1, notably due to the initial heating step to reach the construction temperature and the final cooling step to reach a temperature that is low enough for the powder bed to be able to be handled.

It is not possible to manufacture specimens with mixture #7, notably due to the fact that the powder of the mixture does not flow.

The invention claimed is:

1. A pulverulent composition comprising a powder based on at least one polyaryl ether ketone (PAEK), said composition having at least one first endothermic peak and at least one second endothermic peak,
   the at least one first endothermic peak having a peak temperature of strictly more than 280° C., and
   the at least one second endothermic peak having a peak temperature within a range of 200° C. to 280° C.;
   wherein the at least one first endothermic peak and the at least one second endothermic peak are measured on a thermogram obtained by differential scanning calorimetry according to the standard ISO 11357-3:2018, on first heating, using a temperature ramp of 20° C./min;
   in which the enthalpy measured between 225° C. and 280° C. represents from 15% to 50% of the total enthalpy measured between 225° C. and 330° C. on said thermogram;
   the powder comprising a first powder P1 and a second powder P2, the first powder P1 and the second powder P2 being based, independently or not of one another, on said at least one PAEK;
   wherein the first powder P1 has the at least one first endothermic peak with the peak temperature strictly more than 280° C., and possesses no endothermic peak having a peak temperature of less than or equal to 280° C.; and
   wherein the second powder P2 has the at least one second endothermic peak having a peak temperature within a range of 200° C. to 280° C.

2. The pulverulent composition of claim 1, in which the enthalpy measured between 225° C. and 280° C. is greater than or equal to 20% and/or is less than or equal to 40%, of the total enthalpy measured between 225° C. and 330° C.

3. The pulverulent composition of claim 1, in which the enthalpy measured between 225° C. and 280° C., is from 5 J/g to 20 J/g.

4. The pulverulent composition of claim 1, in which said at least one polyaryl ether ketone is a polyether ketone ketone (PEKK).

5. The pulverulent composition of claim 4, in which said PEKK consists essentially of:
   a terephthalic repeat unit and an isophthalic repeat unit, the formula of the terephthalic repeat unit being:

the formula of the isophthalic repeat unit being:

the molar percentage of terephthalic units relative to the sum of the isophthalic and terephthalic units being from 45% to 75%.

6. The pulverulent composition of claim 1, in which said at least one polyaryl ether ketone is a polymer consisting essentially of:
   a repeat unit of formula:

and a repeat unit of formula:

the molar percentage of units (III) relative to the sum of the units (III) and (IV) being from 0% to 99%.

7. The pulverulent composition of claim 1, in which said at least one polyaryl ether ketone is a polymer consisting essentially of:
   a repeat unit of formula:

and a repeat unit of formula:

the molar percentage of units (III) relative to the sum of the units (III) and (V) being from 0% to 99%.

8. The pulverulent composition of claim 1, in which said at least one PAEK has a viscosity index, measured as a solution at 25° C. in aqueous sulfuric acid solution at 96% by mass, according to the standard ISO 307:2019, of from 0.65 dl/g to 1.15 dl/g.

9. The pulverulent composition of claim 1, having a particle size distribution such that the median diameter $d_{50}$ of the distribution is such that:

$d_{50}$<100 µm.

10. The pulverulent composition of claim 1, in which said at least one polyaryl ether ketone represents at least 50% by weight of the total weight of composition.

11. The pulverulent composition of claim 1, consisting essentially of said at least one polyaryl ether ketone.

12. The pulverulent composition of claim 1,
wherein the at least one first endothermic peak of the first powder P1 has a peak temperature strictly greater than 290° C.; and,
wherein the at least one second endothermic peak of the second powder P2 has a peak temperature of greater than or equal to 220° C. and/or less than or equal to 275° C.

13. The pulverulent composition of claim 12,
wherein the first powder P1 comprises a powder obtained by heat treatment at a temperature greater or equal to 265° C., of an initial powder which has at least one endothermic peak having a temperature strictly greater than 280° C. and an endothermic peak having a peak temperature of from 200° C. to 280° C.; or
wherein the first powder P1 comprises a powder obtained by a method for layer-by-layer construction by sintering of an initial powder or pulverulent composition which has at least one endothermic peak having a temperature strictly greater than 280° C., at a construction temperature of greater than or equal to 265° C.

14. The pulverulent composition of claim 13, wherein the first powder P1 and the second powder P2 have essentially the same chemical composition and/or essentially the same viscosity index and/or essentially the same particle size distribution.

15. The pulverulent composition of claim 1, wherein
the second powder P2 represents 1% to 39% by weight, relative to the total weight of the first powders P1 and the second powder P2.

16. A kit to make the pulverulent composition of claim 1, comprising said first powder P1 and second powder P2.

17. A method for layer-by-layer construction of a three-dimensional object by sintering, caused by electromagnetic radiation, of the pulverulent composition of claim 1, carried out at a minimum construction temperature Tc as estimated by a method for determining the Tc for the layer-by-layer construction of the three-dimensional object by sintering, caused by electromagnetic radiation, said method for determining the Tc comprising
providing the thermogram obtained by differential scanning calorimetry of the pulverulent composition of claim 1 on first heating and using the temperature ramp of 20° C./minute; and,
integrating the thermogram between 225° C. to Tc to obtain a partial enthalpy equal to a value from 3.0 J/g to 7.0 J/g; or,
integrating the thermogram between 225°° C. to Tc to obtain a partial enthalpy from 8.0% to 20.0% relative to a total enthalpy.

\* \* \* \* \*